G. HUHN.

METALLIC PACKING.

APPLICATION FILED APR. 23, 1909.

Reissued Aug. 10, 1909. 13,006.

Witnesses
J. G. Stinkel
L. Kerans

Inventor
Gustav Huhn
by Howard A. Coombs
his Attorney

UNITED STATES PATENT OFFICE.

GUSTAV HUHN, OF BERLIN, GERMANY, ASSIGNOR, BY MESNE ASSIGNMENTS, TO LEONARD R. GRACY.

METALLIC PACKING.

No. 13,006. Specification of Reissued Letters Patent. Reissued Aug. 10, 1909.

Original No. 899,985, dated September 29, 1908, Serial No. 333,671. Application for reissue filed April 23, 1909. Serial No. 491,871.

*To all whom it may concern:*

Be it known that I, GUSTAV HUHN, a subject of the Emperor of Germany, and residing at 6 Oldenburgerstrasse, Berlin, Germany, have invented a new and useful Improvement in Metallic Packing, of which the following is a specification.

My invention relates to an improved metallic packing for piston rods, and the like, and its object is to avoid certain defects and faults, which have made themselves apparent when packing of this kind has been used.

In the Letters Patent of U. S., issued to me on August 4, 1903, and numbered 735,260, I described and claimed a metallic packing ring, comprising a soft metal annular body, which was circular in cross section and filled with a lubricating material, the ends of the ring or ring sections being closed by means permitting the lubricant to ooze out and thus lubricate the rod. Such rings, when subjected to pressure in the stuffing box, are deformed, and there is consequently considerable danger of the closing devices at the ends of the ring becoming loose and permitting the lubricating material to escape too fast. Moreover rings, which are circular in cross section, leave relatively large open spaces around and between them, which spaces become filled with lubricant, a portion of which is therefore wasted. The present invention avoids these defects by forming the rings of the shape in cross section that they would tend to assume under continued pressure in the stuffing box. That is to say, I make the rings initially rectangular in cross section, so that they will fit snugly together, and approximately fill the entire space in the stuffing box around the rod, and consequently will not become deformed by continued use. These rings are usually made in semicircular sections, are filled with a lubricating material, such as graphite, and are provided on their inner faces with small openings through which the material may reach the piston rod. The ends of the sections are closed by a thin piece of sheet lead cut to the proper shape to fit in the open ends of the ring sections and secured therein by soldering. In some cases, I find it desirable to make the ring sections triangular in cross section and to make use of intermediate sections of a flexible material, such as hard rubber, said sections having the same cross sectional shape as the metal packing rings, and tending in use to keep the inner faces of the packing rings snugly against the piston rod.

Figure 1:
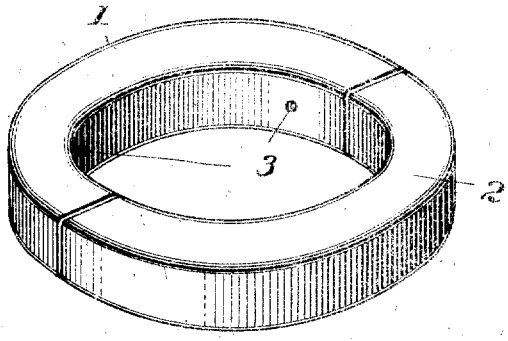
Figure 2:
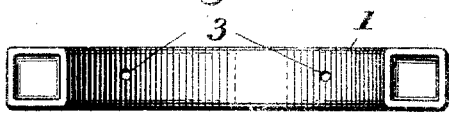
Figure 3:
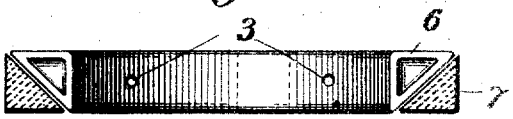
Figure 4:
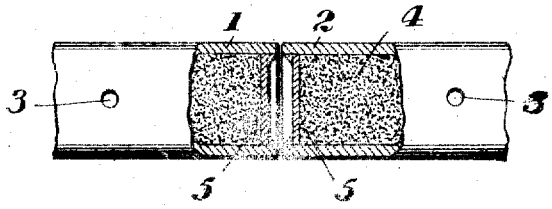

In the accompanying drawings:—Figure 1 is a perspective view of a packing ring constructed in accordance with this invention. Fig. 2 is an end view of one section thereof. Fig. 3 is an end view of the triangular form of ring sections referred to above. Fig. 4 is a sectional view through the ends of two adjacent ring sections, showing the closures.

Similar reference numerals designate corresponding parts in all the figures of the drawings.

The ring, shown in Figs. 1 and 2, consists of rectangular hollow sections 1 and 2, made of soft metal, such as an alloy of lead and copper, for example, and provided with openings 3 on their inner faces. These sections are filled with the lubricating material 4, and the ends are then closed by the thin lead plates 5.

In Fig. 3, the metallic ring section 6 is made triangular in cross section, as shown, and the other half of the square or rectangle is made up by a triangular ring section 7, which is solid and made of some more or less flexible material, such as rubber. When a number of such composite rings are assembled in the stuffing box, and subjected to endwise pressure by the gland, there is a tendency for the metallic sections to be pressed against the piston rod, and of course the same is true should the surface of the rod or plunger be uneven or not run true. That is to say, the packing can yield and return to its original position, owing to the action of the flexible sections.

The closing plates 5 are made, as I stated, of thin sheet lead, and are secured in the ends of this ring section by soldering them thereto.

In use, the ends of the semicircular sections do not quite abut against each other, as indicated in Fig. 4, and there is a tendency for the openings 3 to become smaller, which is desirable, as after the packing has been in use for a while, not so much lubricating material is required as at first. I have also found that in practice, after some time a small amount of the lubricant will issue from the ends of the ring sections around the closing plates 5, which thus keeps the rod lubricated, even if the openings 3 were to become entirely closed.

What I claim, is:—

1. A packing-ring for stuffing-boxes and the like, consisting of a hollow, rectangular, soft-metal casing, having its ends closed by imperforate, soft-metal plugs and openings for lubricant in its inner face.

2. A packing-ring for stuffing-boxes and the like, consisting of a hollow, soft-metal casing having plane, flat surfaces, openings for lubricant in its inner face and soft-metal plugs closing its ends.

3. A packing-ring for stuffing-boxes and the like, comprising segmental, hollow, soft-metal sections, rectangular in cross-section and having openings for lubricant in their inner faces, each section being closed at its ends by imperforate, soft-metal plugs.

4. A packing-ring for stuffing-boxes and the like, comprising segmental, hollow, soft-metal sections, having plane, flat surfaces and openings for lubricant in their inner faces, the ends of each section being closed by soft-metal plugs.

5. A packing-ring for stuffing-boxes and the like, comprising in combination hollow, soft-metal sections, having plane, flat surfaces, the ends of each section being closed by soft-metal plugs, and solid, resilient sections having complementary plane, flat surfaces.

In testimony whereof, I have signed my name to this specification in the presence of two subscribing witnesses.

GUSTAV HUHN.

Witnesses:

HENRY HASPER,

WOLDEMAR HAUPT.